US012620303B2

(12) United States Patent
Zipfl et al.

(10) Patent No.: US 12,620,303 B2
(45) Date of Patent: May 5, 2026

(54) PREDICTING THE BEHAVIOR OF ROAD USERS BASED ON A GRAPH REPRESENTATION OF A TRAFFIC SITUATION

(71) Applicant: Robert Bosch GmbH, Stuttgart (DE)

(72) Inventors: Maximilian Zipfl, Karlsruhe (DE); Achim Rettinger, Trier (DE); Cory Henson, Pittsburgh, PA (US); Felix Hertlein, Karlsruhe (DE); Juergen Luettin, Renningen (DE); Lavdim Halilaj, Leonberg (DE); Stefan Schmid, Waiblingen (DE); Steffen Thoma, Karlsruhe (DE)

(73) Assignee: ROBERT BOSCH GMBH, Stuttgart (DE)

( * ) Notice: Subject to any disclaimer, the term of this patent is extended or adjusted under 35 U.S.C. 154(b) by 289 days.

(21) Appl. No.: 18/193,364

(22) Filed: Mar. 30, 2023

(65) Prior Publication Data

US 2024/0071211 A1 Feb. 29, 2024

(30) Foreign Application Priority Data

Aug. 31, 2022 (DE) ..................... 10 2022 209 034.9

(51) Int. Cl.
*G08G 1/01* (2006.01)
*B60Q 9/00* (2006.01)
(Continued)

(52) U.S. Cl.
CPC ........... *G08G 1/0133* (2013.01); *B60Q 9/008* (2013.01); *G06N 5/022* (2013.01); *G08G 1/161* (2013.01)

(58) Field of Classification Search
CPC .... G08G 1/0133; G08G 1/161; G08G 1/0112; G08G 1/0129; B60Q 9/008
See application file for complete search history.

(56) References Cited

U.S. PATENT DOCUMENTS

2018/0307967 A1* 10/2018 Graf ........................ G01S 7/417
2021/0197858 A1* 7/2021 Zhang .................... G08G 1/161
(Continued)

FOREIGN PATENT DOCUMENTS

DE 102019124724 A1 3/2021
DE 102021005084 A1 1/2022

OTHER PUBLICATIONS

AWS, "What is a Neural Network?" May 2022 (Year: 2022).*

*Primary Examiner* — Stephanie T Su
(74) *Attorney, Agent, or Firm* — NORTON ROSE FULBRIGHT US LLP

(57) ABSTRACT

A method for predicting the behavior of at least one road user in a traffic situation. The method includes: obtaining a graph representation of the traffic situation, wherein nodes represent road users, edges represent interactions between the road users and define an adjacency between road users, each node is associated with a state, and each edge is associated with edge attributes; computing an evolution of the states of the nodes based at least in part on a self-evolution of the state of each considered node that is dependent on this state and mediated by a self-evolution operator; and an interaction of each considered node with other nodes that is dependent on the states of these other nodes and mediated by an interaction operator; and computing a sought property that characterizes the behavior of the at least one road user.

15 Claims, 5 Drawing Sheets

(51) Int. Cl.
    *G06N 5/022*        (2023.01)
    *G08G 1/16*          (2006.01)

(56)               References Cited

U.S. PATENT DOCUMENTS

2022/0036173 A1*    2/2022    Wulfe .................. G05D 1/0221
2023/0229935 A1*    7/2023    Yang ..................... G06N 3/045
                                             706/12

* cited by examiner

US 12,620,303 B2

1

PREDICTING THE BEHAVIOR OF ROAD USERS BASED ON A GRAPH REPRESENTATION OF A TRAFFIC SITUATION

CROSS REFERENCE

The present application claims the benefit under 35 U.S.C. § 119 of German Patent Application No. DE 10 2022 209 034.9 filed on Aug. 31, 2022, which is expressly incorporated herein by reference in its entirety.

FIELD

The present invention relates to the determining of the behavior of road users from measurement data that characterize a traffic situation. Knowing the behavior of other road users is, inter alia, important for planning the next actions of an ego-vehicle in traffic.

BACKGROUND INFORMATION

A vehicle that is being steered through traffic in an at least partially automated manner needs to capture its surroundings and to constantly adapt its own actions to changes in these surroundings. In particular, the vehicle needs to respond to actions of other road users. These actions are usually driven by some interest of the plans of the other road user. However, information about interest or plans for future behavior in traffic are presently exchanged between users only to a very rudimentary extent, namely in the form of turn signals. As a consequence, it is not easy to predict the future behavior of a road user.

SUMMARY

The present invention provides a method for predicting the behavior of at least one road user in a traffic situation. Herein, the term "road user" comprises all human-piloted and at least partially automated entities that are able to participate in road traffic, such as cars, trucks, buses, trams, motorcycles, bicycles, electric scooters, and humans with or without assisting devices such as roller skates or rollerblades. Also, the term is not limited to users of the driving surface of the road, but also covers users of sidewalks or cycle ways that are also to be considered part of the road.

According to an example embodiment of the present invention, in the course of the method, a graph representation of the traffic situation is obtained. Knowledge about the traffic situation that may be processed into a graph representation may be in any form.

For example, the graph representation may be computed from one or more top-view images of the traffic situation, which may be recorded by one or more fixed or mobile cameras. For example, some intersections, tunnels, or stretches of road are routinely monitored by cameras to ensure smooth operations, detect safety problems in a tunnel, or dynamically decide whether to open a freeway shoulder as an additional lane to traffic.

Alternatively or in combination, sensor data recorded with at least one sensor carried by at least one road user may also be used to compute the graph representation. For example, every car with functionality for at least partially automated driving has at least one camera as a sensor that records camera images. Very frequently, cars are also equipped with radar and/or lidar sensors that produce radar data, respectively lidar data. Combinations of different sensor modalities increase the probability that at least one modality will supply usable information from the environment of the car at any time even if one modality is temporarily not working. For example, a camera may be temporarily unable to supply images because it is directly facing the sun and its sensor is fully saturated.

Also, according to an example embodiment of the present invention, data exchanged by vehicle to vehicle, V2V, communication between road users may be used to compute the graph representation. In this manner, the traffic situation may be assessed more accurately from multiple perspectives. Data of all kinds may be aggregated and processed into a graph representation. The more diverse the collected data is, the more complete the information comprised in the graph representation.

In the graph representation, the nodes v of the graph represent road users i,j. Each node v is associated with a state h comprising a plurality of state variables. The edges (i,j) of the graph represent interactions between the road users i,j and define an adjacency between road users i,j. Each edge (i,j) is associated with a plurality of edge attributes $e_{i,j}$.

An evolution of the states h of the nodes v is computed. This evolution comprises at least two components, namely
  a self-evolution of the state h of each considered node v that is dependent on at least this state (and possibly also a history of previous states) and mediated by a self-evolution operator $\Theta$, and
  an interaction of each considered node v,i with other nodes v,j≠i that is dependent on the states $h_{j\neq i}$ of these other nodes v,j≠i and mediated by an interaction operator $\Theta_{edge}$.

At least one sought property $a_i$ that characterizes the behavior of at least one road user i is computed by applying an evaluation operator $\phi$ to
  the state $$h_i^s$$

of the node v,i in the graph representation that corresponds to this road user i, and/or
  a work product derived from such state $$h_i^s.$$

The sought property $a_i$ may comprise any suitable quantity and/or quality that characterizes the behavior of the at least one road user i. For example, it may comprise measurable quantities, but also discrete properties, such as the type of road user, the destination of the road user, or even a classification whether the next action of the road user i is likely to be aggressive and/or offensive.

A main advantage of this framework is that it permits maximum flexibility to
  on the one hand, use as much explicit information about the states of the nodes and the edges as there is available in the concrete application; and
  on the other hand, use trained machine learning models, such as neural networks, wherever there is little or no explicit information available.

For example, if the data from which the graph representation is derived allows for an assignment of road users to lanes of traffic, this may be exploited to distinguish between different types of relationships between road users. In particular, there may be a longitudinal relationship between road users that follow each other in a same lane of traffic; or a lateral relationship between road users that travel on adjacent lanes of traffic; or an intersecting relationship between road users travelling on merging and/or intersecting lanes.

The edge attributes $e_{ij}$ of at least one edge (i,j) may be configured to encode said type of relationship.

Alternatively or in combination to this, the edge attributes $e_{ij}$ of at least one edge (i,j) may comprise a joint probability $P(e_{ij})$ that the two road users i,j corresponding to the nodes v,i;v,j connected by this edge (i,j) are on particular lanes; and/or a distance $d_{i,j}$ between the two road users i,j corresponding to the nodes v,i;v,j connected by this edge (i,j), and/or between one or both road users i,j and a point of intersection $p_{int}$ between the two road users i,j.

For example, if P(i) is the probability that the assignment of road user i to its lane is correct, and P(j) is the probability that the assignment of road user j to its lane is correct, the joint probability corresponding to the edge (i,j) is $$P(e_{ij})=P(i)\cdot P(j).$$

The distance $d_{i,j}$ may be indicative of a need of one road user i to change its own behavior due to the presence of the other road user j.

In a particularly advantageous embodiment of the present invention, the state variables of at least one node comprise:

an indication of a type of road user; and/or a pollution emission class of a road user; and/or dimensions of a road user; and/or an estimated mass of a road user; and/or a velocity of a road user; and/or a state of indicator lights of a road user; and/or a presence of cargo and/or passengers on board a road user; and/or information about a destination of a road user; and/or the context of a road user (e.g. approaching an intersection with a car coming from right, or driving past a school, passing a (recently) parked car).

None of these properties (which may, for example, include quantities and/or qualities) allow, on its own, for a direct and unambiguous prediction of the future behavior of the road user corresponding to the node. However, each such property is, to some degree, a clue about the intention that is behind the behavior of that road user, and this intention is of great help when predicting the future behavior of the road user. For example, if information about a destination of the road user, or something else that gives at least a hint towards such destination, is known, then the road user is likely to proceed further in a direction that is consistent with movement towards that destination. Exploiting these and other weak indications is a job that can be performed very well by means of a trained neural network.

Therefore, in a further particularly advantageous embodiment, the self-evolution operator $\Theta$, and/or the interaction operator $\theta_{edge}$, and/or the evaluation operator $\phi$, comprises a trained neural network.

In particular, neural networks are also well-suited to exploit additional hidden variables. Hidden variables are variables without a direct relationship to an observable property of a road user, or to an observable property of a piece of road between road users if the hidden variable relates to an edge. Thus, no explicit knowledge can be used to determine these hidden variables. But a neural network can nonetheless learn how hidden variables evolve, or how the sought property $a_i$ that characterizes the behavior of at least one road user i depends on such hidden variables, based on training examples.

Therefore, in a further particularly advantageous embodiment, the state h variables of the nodes v, and/or the edge attributes $e_{i,j}$ of edges (i,j), comprise hidden variables without a direct relationship to an observable property of a road user i,j, respectively of a piece of road between road users i,j.

In particular, one or more hidden variables may relate to the intention of the road user. This intention is not directly measurable or observable, but it may be interdependent with other observable properties, and it may be a major factor in the decision what action the road user will perform. The intention may also evolve with time. Therefore, hidden variables provide a way to encode and consider the intention even though it is not directly measurable or observable.

For example, an evolution of a state $$h_i^s$$

of the node v,i from a particular discrete time step s to time step s+1 may be written as:

$$h_i^{s+1} = h_i^s \cdot \Theta + m_i^{s+1},$$

wherein $$m_i^{s+1}$$

represents the aggregated interaction "message" that is being conveyed from other nodes v,j≠i:

$$m_i^{s+1} = \frac{1}{|N(i)|} \sum_{j \in N(i)} h_s^j \cdot \theta_{edge}(e_{ij}).$$

That is, the states v,j≠i in a defined neighborhood N(i) around state v,i are relevant for the evolution of the state v,i.

Herein, the evolution operator $\Theta$ with trained weights performs a double function. On the one hand, it describes the self-evolution of the state $$h_i^s$$

as such. On the other hand, the relative magnitude of $\Theta$ with respect to $$m_i^{s+1}$$

describes how important self-evolution is compared with interaction.

The evolution may be performed for only one time step, but also for multiple time steps. At a last time step S, the sought property $a_i$ may be evaluated by the evaluation operator $\phi$ as $$a_i = \phi(h_i^s).$$

Herein, for example, $$h_i^S$$

may contain on the order of 64 variables, with only a small fraction of them being tied to concrete observable properties of the road user i.

Training of all involved neural networks may be performed end-to-end by providing training examples in the form of graph representations of traffic situations that are labelled with ground truth $$a_i^*$$

regarding the sought property $a_i$. That is, the graph representation may be processed as discussed above, yielding a value $a_i$ for the sought property. This value $a_i$ may be compared to the ground truth value $a_i^*$, and the deviation from the ground truth value $$a_i^*,$$

may be rated with a loss function. For example, given a set V of n nodes v, the loss function $$L = \frac{1}{n}\sum_{i \in V}|a_i - a_i^*|$$

may be used. The parameters that characterize the behavior of the neural networks may then be optimized that, when processing further graph representations of traffic situations as training examples, the value of the loss function L progressively improves.

But it is also possible to train or at least pre-train one or more of the neural networks using ground truth that relates to the performance of one individual neural network (such as for the self-evolution or for the interaction), or even pre-train such networks in an unsupervised manner on unlabeled training data. It all depends on which ground truth is available.

In one example embodiment of the present invention, the interaction operator $\theta_{edge}$ may comprise a neural network with at least two fully connected layers that is applied to the edge attributes $e_{i,j}$ of an edge (i,j) connecting two interacting nodes i,j. For example, such a neural network may learn which attributes $e_{i,j}$ of the edges (i,j) have which influence on the interaction between neighboring nodes i,j.

In a further example embodiment of the present invention, the evaluation operator $\phi$ may comprise a multi-layer perceptron that is configured as a classifier and/or regressor for the sought property that characterizes the behavior of the at least one road user i. Depending on the availability of suitable training examples, such a classifier and/or regressor may be pre-trained at least partially before the end-to-end training based on graph representations of traffic situations.

In a particularly advantageous embodiment of the present invention, the sought property $a_i$ that characterizes the behavior of the at least one road user i comprises an acceleration of this at least one road user i. Such acceleration may comprise any linear, angular or vectorial acceleration. Thus, by means of an acceleration, very many different potential changes of behavior of the road user may be modelled. In particular, not only changes of speed, but also changes of direction are tied to accelerations.

In a further particularly advantageous embodiment of the present invention, the graph representation is obtained, and evolutions of the states $h_i$ of the nodes v are computed, for a temporal sequence of traffic situations. For each traffic situation in the sequence, the computed states $h_i$ of the nodes v are inputted into a sequence-processing neural network that is adapted to process sequences of input data. The evaluation operator $\phi$ is applied to an output of the sequence-processing neural network.

That is, each time computed states $h_i$ of the nodes v are inputted into the sequence-processing neural network, an encoding is generated at the output of this sequence-processing neural network. This encoding is updated every time new computed states $h_i$ arrive at the sequence-processing neural network. The final encoding is then a work product composed of many different computed states $h_i$, and just as it can be done for a single such state $h_i$, the sought property $a_i$ may be computed from this work product by the evaluation operator $\phi$. Examples for sequence-processing neural networks include recurrent neural networks and transformer networks.

By using a sequence-processing neural network, in particular, common information between the traffic situations may be exploited in order to arrive at an even better prediction for the sought property $a_i$. For example, when an intersection is monitored by a fixed camera with a fixed field of view, traffic situations in a temporal sequence cannot be totally different from one another because road users cannot appear and disappear at infinite speeds. For every road user that is in every traffic situation in the temporal sequence, the sought property, such as the acceleration, may be predicted. Road users that enter or leave the scene within the sequence can still be considered for the calculation of the historical states.

A prime example of a sequence-processing neural network that can be used in the context of the present method is the long short-term memory, LSTM.

A main use case of the method presented here is the evaluation of traffic scenes for the purpose of determining whether the behavior of an ego-vehicle needs to be adapted to fit this traffic scene. Such adapting may be performed by the vehicle automatically, or by a driver of this vehicle once he has been alerted to the need for adapting.

Therefore, in a further particularly advantageous embodiment of the present invention, based at least in part on the computed property $a_i$ that characterizes the behavior of the at least one road user i, an actuation signal is computed. A vehicle, and/or alarming means (i.e., an alarm) for alerting a driver of the vehicle, are actuated with this actuation signal.

The method may be wholly or partially computer-implemented and thus embodied in software. The present invention therefore also relates to a computer program with machine-readable instructions that, when executed by one or more computers and/or compute instances, cause the one or more computers and/or compute instances to perform the method described above. Herein, control units for vehicles, and other embedded systems within technical devices that are able to execute machine-readable instructions, are to be regarded as computers as well. Examples for compute instances are virtual machines, containers or serverless execution environments in which machine-readable instructions may be executed in a cloud. The present invention also relates to a machine-readable data carrier and/or a download product with the computer program. A download product is a digital product with the computer program that may, e.g., be sold in an online shop for immediate fulfilment and download to one or more computers. The present invention also relates to one or more compute instances with the computer program, and/or with the machine-readable data carrier and/or download product.

In the following, further advantageous embodiments will be illustrated using Figures without any intention to limit the scope of the present invention.

DETAILED DESCRIPTION OF EXAMPLE EMBODIMENTS

Figure 1:
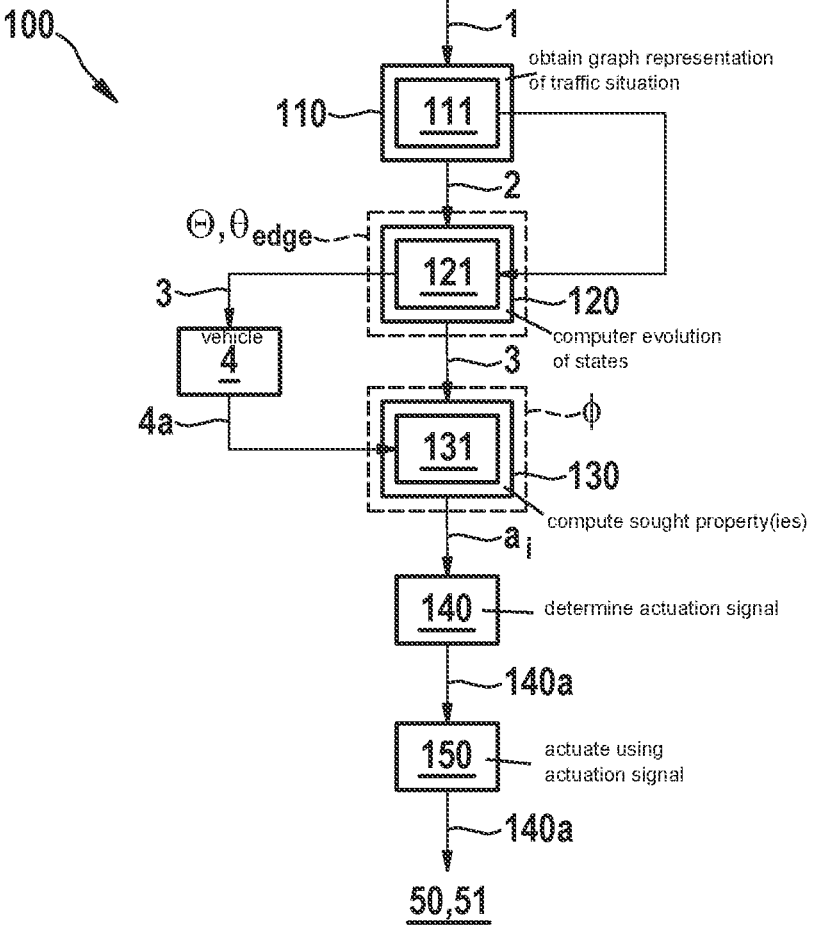
FIG. 1 shows an exemplary embodiment of the method 100 for predicting the behavior of at least one road user i in a traffic situation 1.

FIG. 1 is a schematic flow chart of an embodiment of the method 100 for predicting the behavior of at least one road user i in a traffic situation 1.

In step 110, a graph representation 2 of the traffic situation 1 is obtained. Herein, the nodes v of the graph 2 represent road users i,j,
the edges (i,j) of the graph 2 represent interactions between the road users i,j and define an adjacency between road users i,j,
each node v is associated with a state h comprising a plurality of state variables, and
each edge (i,j) is associated with a plurality of edge attributes $e_{i,j}$.

In step 120, an evolution 3 of the states h of the nodes v is computed based at least in part on
a self-evolution of the state $h_i$ of each considered node v that is dependent on this state $h_i$ and mediated by a self-evolution operator $\Theta$; and
an interaction of each considered node v,i with other nodes v,j≠i that is dependent on the states $h_{j\neq i}$ of these other nodes v,j≠i and mediated by an interaction operator $\theta_{edge}$.

8

In step 130, at least one sought property $a_i$ that characterizes the behavior of the at least one road user i is computed by applying, to the state $$h_i^s$$

of the node vi in the graph representation that corresponds to this road user i and/or to a work product derived from such state $$h_i^s,$$

an evaluation operator φ.

In step 140, based at least in part on the computed property $a_i$ that characterizes the behavior of the at least one road user i, an actuation signal 140a is determined.

In step 150, a vehicle 50, and/or alarming means (i.e., an alarm) 51 for alerting a driver of the vehicle 50, is actuated with this actuation signal 140a.

According to block 111, graph representations 2 may be obtained for multiple traffic situations 1 in a temporal sequence of traffic situations 1. According to block 121, evolutions 3 of the states $h_i$ of the nodes v may then be computed for each such graph representation, and inputted to a sequence-processing neural network 4. According to block 131, the evaluation operator φ may then compute the property $a_i$ that characterizes the behavior of the at least one road user i from the output 4a of the sequence-processing neural network 4.

Figure 2A:
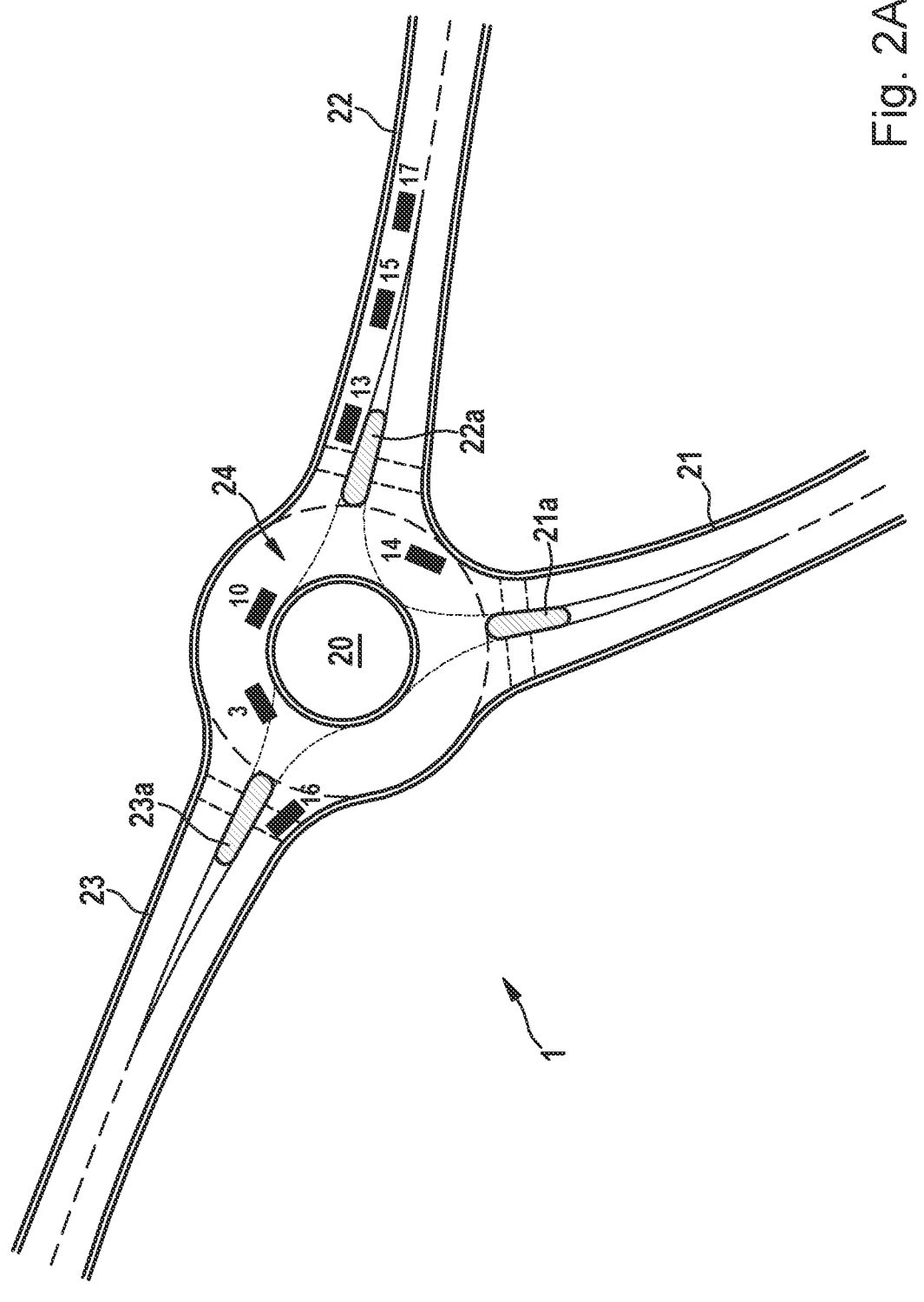
FIGS. 2A and 2B show an exemplary traffic situation 1 seen from bird's eye view (FIG. 2A) and exemplary graph representation 2 derived from this traffic situation (FIG. 2B).
Figure 2B:
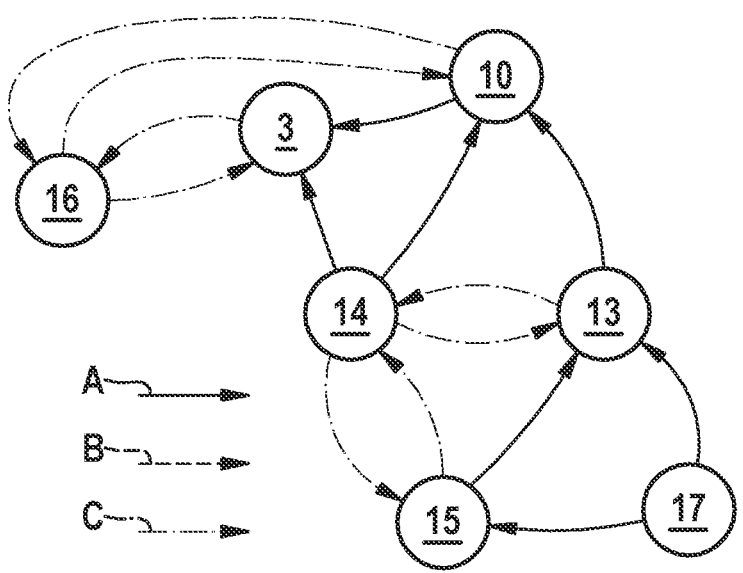

FIG. 2 illustrates how a traffic situation 1 may be converted into a graph representation 2. FIG. 2a is an illustrative bird's eye view of the traffic situation 1, and FIG. 2b is the exemplary graph representation 2 derived from it.

The traffic situation 1 is centered on an intersection 20 where three roads 21, 22 and 23 meet. Vehicles may change between these roads 21, 22 and 23 by means of a roundabout 24 where the traffic is running counter-clockwise. There are traffic islands 21a, 22a and 23a where the roads 21, 22 and 23 meet the roundabout 24. In the situation 1 shown in FIG. 2a, seven vehicles 3, 10, 13, 14, 15, 16 and 17 are present at the intersection 20.

The graph representation 2 comprises three different types of relationship between road users, namely:
a longitudinal relationship between road users that follow each other in a same lane of traffic (labelled A, solid line);
a lateral relationship between road users that travel on adjacent lanes of traffic (labelled B, dashed line); and
an intersecting relationship between road users travelling on merging and/or intersecting lanes (labelled C, dash-dotted line).

Vehicle 16 has mutual intersecting relationships with both vehicles 3 and 10 because vehicles 3 and 10 are already using the roundabout lane 24 on which vehicle 16 is about to enter.

On the other side of the roundabout, there is an intersecting relationship between vehicles 13 and 14 because vehicle 14 is already using the roundabout lane 24 and vehicle 13 is about to enter it. The same intersecting relationship exists between vehicle 14 and vehicle 15 because vehicle 15 will also soon enter the roundabout lane 24.

Theoretically, such a relationship could also exist between vehicle 17 and vehicle 14. But vehicle 17 is farther away from the intersection 20 than vehicles 13 and 15, and there is a limit as to the maximum distance in which other vehicles are deemed to be relevant. The distances between the vehicles 13, 15 and 17 are below this limit; therefore, longitudinal following relationships exist between these three vehicles.

At the same time, vehicle 10 has a longitudinal relationship with vehicle 3, and vehicle 14 has longitudinal relationships with both vehicles 10 and 3 because all three vehicles 14, 10 and 3 are on the roundabout lane 24.

Figure 3:
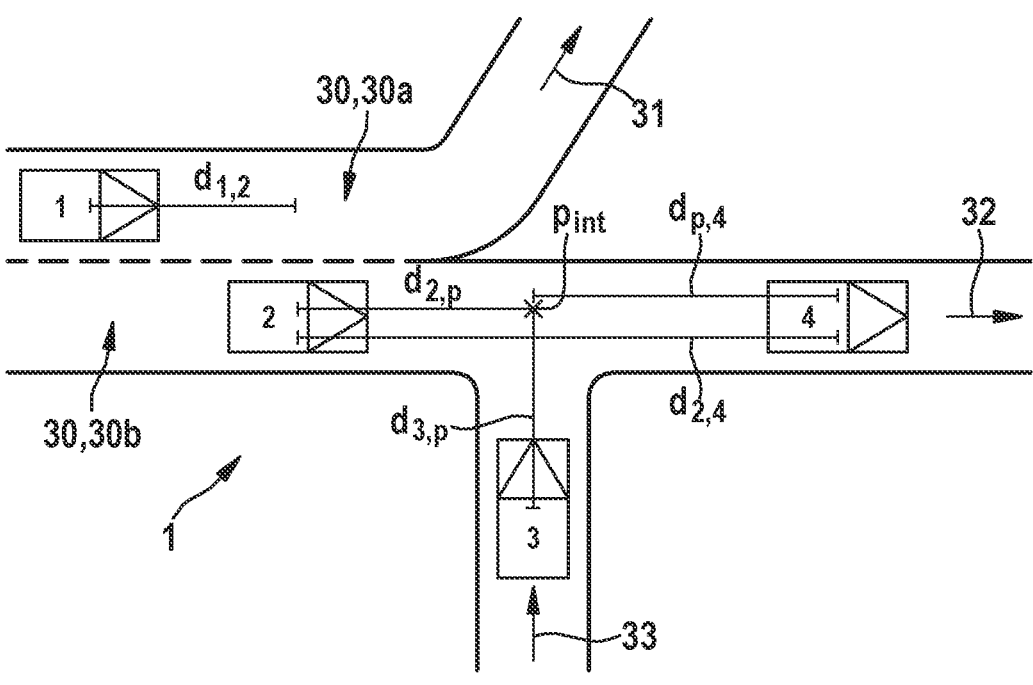
FIG. 3 shows an exemplary traffic situation 1 with exemplary distances $d_{i,j}$ between road users that can be measured.

FIG. 3 illustrates another exemplary traffic situation 1, and also how different distances $d_{i,j}$ between road users that can be measured in this traffic situation 1.

In the situation 1 shown in FIG. 3, a large road 30 with two lanes 30*a* and 30*b* splits into two smaller roads 31 and 32. Traffic on the first lane 30*a* will move on to the smaller road 31, and traffic on the second lane 30*b* will move on to the smaller road 32. Also, another road 33 merges with the smaller road 32. The situation 1 comprises four vehicles with identifiers 1 to 4: vehicle 1 on lane 30*a* of large road 30, vehicle 2 on lane 30*b* of large road 30, vehicle 3 on merging road 33 and vehicle 4 on smaller road 32.

The distance $d_{1,2}$ between vehicles 1 and 2 can be measured along the centerline of the road 30, between designated reference points (such as center points) of the vehicles 1 and 2. In this manner, the distance $d_{1,2}$ remains unchanged when one of the vehicles 1 and 2 changes lanes. The distance $d_{2,1}$ is $-d_{1,2}$. Vehicles 1 and 2 have a lateral relationship because they move in the same direction on different lanes.

Vehicles 2 and 3 have an intersecting relationship because vehicle 2 is already on the lane that vehicle 3 is about to enter. The trajectories of the two vehicles 2 and 3 could intersect at point $p_{int}$. Therefore, from the perspective of vehicle 2, the relevant distance $d_{2,3}$ to vehicle 3 is the distance $d_{2,p}$ between the present position of vehicle 2 and the intersection point $p_{int}$. Likewise, from the perspective of vehicle 3, the relevant distance $d_{3,2}$ to vehicle 2 is the distance $d_{3,p}$ between the present position of vehicle 3 and the intersection point $p_{int}$.

Vehicles 2 and 4 have a normal longitudinal following relationship with a distance $d_{2,4}$.

Vehicle 3 has also a longitudinal following relationship with vehicle 4 because vehicle 4 is moving away from the intersection point $p_{int}$, with a distance $d_{3,4}=d_{3,p}+d_{p,4}$ that is computed as if the right turn that vehicle 3 has to make was not present.

Figure 4:
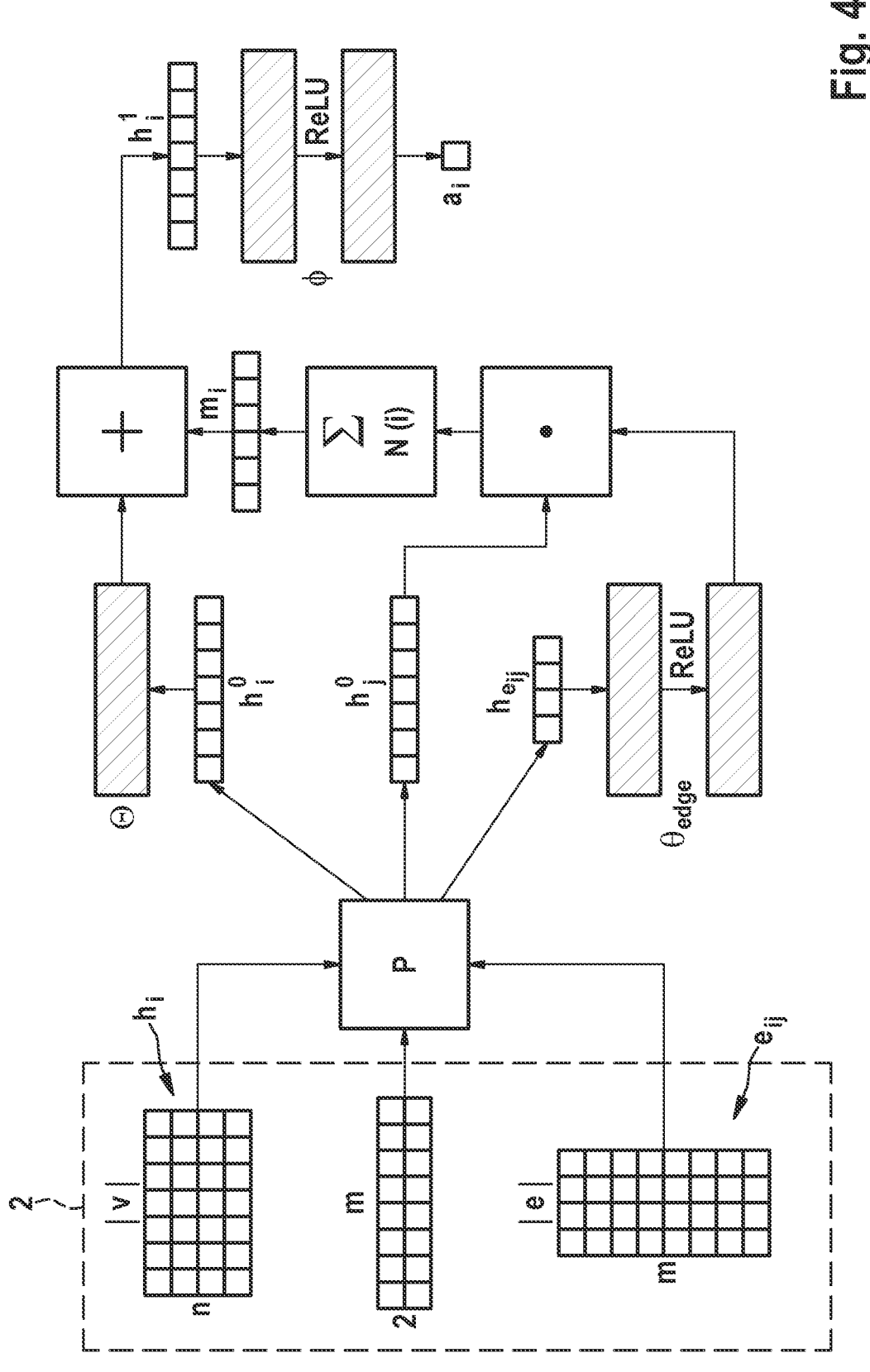
FIG. 4 shows a prediction of a property $a_i$ that characterizes the behavior of a road user i with one updating step for states h of nodes v, according to an example embodiment of the present invention.

FIG. 4 illustrates how a property $a_i$ that characterizes the behavior of a road user i based on a graph representation 2 of a traffic situation 1, with one updating step for states h of nodes v.

The graph representation 2 comprises a matrix that, for each of the n nodes v, comprises a state vector $h_i$ with |v| components. Likewise, there is another matrix that, for every edge (i,j) of the total m possible edges, contains a vector of |e| edge parameters $e_{ij}$. An m-by-2 adjacency matrix stores which nodes are connected by which edges.

The propagation module P comprises the means to update each state of a node. In the example shown in FIG. 4, one state $$h_i^0$$

at time step 0 is being updated. To this end, first the self-evolution operator $\Theta$ is applied to this state $h_i^0$. Then, the interaction with other nodes j is computed. For the respective edge (i,j), applying the interaction operator $\theta_{edge}$ to the edge attributes $e_{i,j}$ of this edge (i,j) produces a result that can be regarded as a coupling strength, and this coupling strength multiplied by the state $$h_j^0$$

of node j at time step 0 produces a contribution of node j to the message $m_i$. After having been updated by the self-evolution operator $\Theta$, the state $$h_i^0$$

is being updated with this message $m_i$ to yield a new state $$h_i^1.$$

Based on this new state $$h_i^1,$$

the sought property $a_i$ is predicted by the evaluation operator $\phi$. The presence of the sign "ReLU" at an evaluation step signifies that ReLU is the activation function of the neural network used for the respective step.

Figure 5:
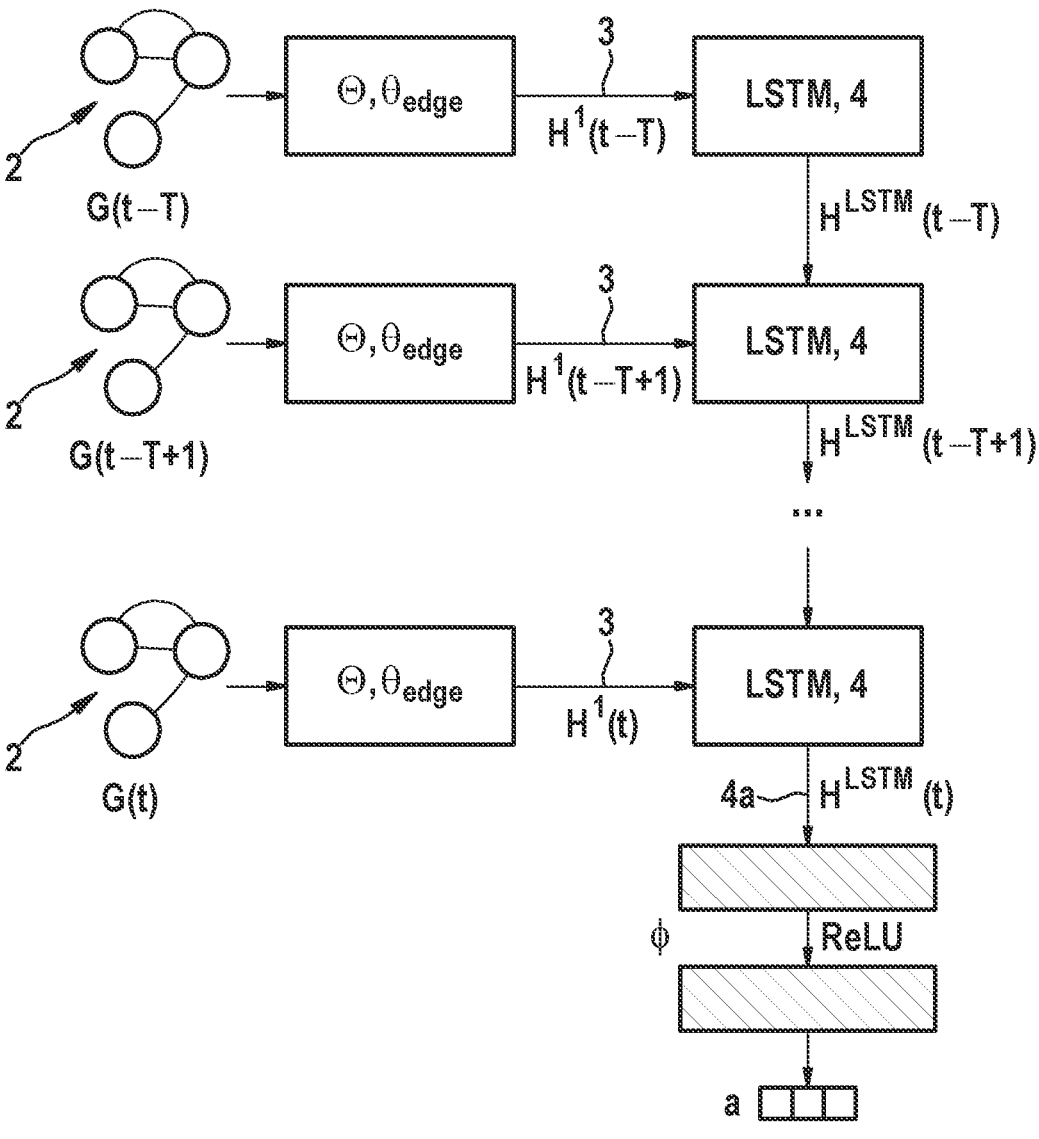
FIG. 5 shows a prediction of a property $a_i$ that characterizes the behavior of a road user i with the aid of a LSTM sequence-processing network 4, according to an example embodiment of the present invention.

FIG. 5 illustrates how a property $a_i$ that characterizes the behavior of a road user i can be predicted with the aid of a LSTM recurrent network as sequence-processing network 4.

Instead of just one single graph representation 2 for one single point in time, multiple graph representations 2 pertaining to multiple points in time t, t−1, . . . , t−T+1, t−T are obtained. Based on these graph representations 2, an update 3 to the states $h_i$ of nodes v,i is computed and provided as input to a long short-term memory, LSTM, as sequence-processing neural network 4. Each time, the encoding at the output of this LSTM is updated. The final encoding is then processed by the evaluation operator $\phi$, in the same manner as the new state $$h_i^1$$

is processed in the example shown in FIG. 4.

What is claimed is:

1. A method for predicting a behavior of at least one road user in a traffic situation, comprising the following steps:
   obtaining a graph representation of the traffic situation, the graph representation having nodes and edges, wherein:
      the nodes of the graph represent road users,
      the edges of the graph represent interactions between the road users and define an adjacency between road users,
      each node of the nodes is associated with a state including a plurality of state variables, and
      each edge of the edges is associated with a plurality of edge attributes;

computing an evolution of the states of the nodes based at least in part on:

a self-evolution of the state of each considered node that is dependent on at least the state and mediated by a self-evolution operator; and an interaction of each considered node with other nodes that is dependent on the states of the other nodes and mediated by an interaction operator; and computing at least one sought property that characterizes the behavior of the at least one road user by applying, to the state of the node in the graph representation that corresponds to the at least one road user and/or to a work product derived from the state of the node in the graph representation that corresponds to the at least one road user, an evaluation operator, wherein the self-evolution operator and/or the interaction operator, and/or the evaluation operator includes training a neural network, and wherein the interaction operator includes a neural network with at least two fully connected layers that is applied to the edge attributes of an edge connecting two interacting nodes;

wherein computing the at least one sought property includes:

updating the self-evolution operator to yield a new state of a node; and predicting, based on the new state, at least one sought property by the evaluation operator of the neural network for each road user in a temporal sequence.

2. The method of claim 1, wherein the graph representation is computed from:

one or more top-view images of the traffic situation; and/or sensor data recorded with at least one sensor carried by at least one road user; and/or data exchanged by vehicle-to-vehicle communication between road users.

3. The method of claim 1, wherein the edge attributes of at least one edge of the edges are configured to encode:

a longitudinal relationship between road users that follow each other in a same lane of traffic; or a lateral relationship between road users that travel on adjacent lanes of traffic; or an intersecting relationship between road users travelling on merging and/or intersecting lanes.

4. The method of claim 1, wherein the edge attributes of at least one edge of the edges includes:

a joint probability that two road users of the road users corresponding to the nodes connected by the edge are on particular lanes; and/or a distance between the two road users corresponding to the nodes connected by the edge, and/or between one or both of the two road users and a point of intersection between the two road users.

5. The method of claim 1, wherein the state variables of at least one node of the nodes include:

an indication of a type of road user represented by the node; and/or a pollution emission class of the road user represented by the node; and/or dimensions of the road user represented by the node; and/or an estimated mass of the road user represented by the node; and/or a velocity of the road user represented by the node; and/or a state of indicator lights of the road user represented by the node; and/or a presence of cargo and/or passengers on board the road user presented by the node; and/or information about a destination of the road user represented by the node; and/or a context of the road user represented by the node.

6. The method of claim 1, wherein the sought property that characterizes the behavior of the at least one road user includes an acceleration of the at least one road user.

7. The method of claim 1, wherein:

the graph representation is obtained, and evolutions of the states of the nodes are computed, for a temporal sequence of traffic situations;

for each traffic situation in the sequence, the computed states of the nodes are inputted into a sequence-processing neural network that is adapted to process sequences of input data; and the evaluation operator is applied to an output of the sequence-processing neural network.

8. The method of claim 1, further comprising:

determining, based at least in part on the computed property that characterizes the behavior of the at least one road user, an actuation signal; and actuating, using the actuation signal, a vehicle and/or an alarm for alerting a driver of the vehicle.

9. The method of claim 1, wherein a relative magnitude of the evolution operator with respect to an aggregated interaction message conveyed by a subset of the nodes indicates an importance the self-evolution is compared with the interaction.

10. The method of claim 1, wherein the state variables of the nodes and/or the edge attributes of the edges, include hidden variables without a direct relationship to an observable property of a road user, respectively of a piece of road between road users.

11. The method of claim 1, wherein the evaluation operator includes a multi-layer perceptron that is configured as a classifier and/or regressor for the sought property that characterizes the behavior of the at least one road user.

12. A non-transitory machine-readable data carrier on which is stored a computer program for predicting a behavior of at least one road user in a traffic situation, the computer program, when executed by one or more computers and/or compute instances, causing the one or more computers and/or compute instances to perform the following steps:

obtaining a graph representation of the traffic situation, the graph representation having nodes and edges, wherein:

the nodes of the graph represent road users, the edges of the graph represent interactions between the road users and define an adjacency between road users, each node of the nodes is associated with a state including a plurality of state variables, and each edge of the edges is associated with a plurality of edge attributes;

computing an evolution of the states of the nodes based at least in part on:

a self-evolution of the state of each considered node that is dependent on at least the state and mediated by a self-evolution operator; and an interaction of each considered node with other nodes that is dependent on the states of the other nodes and mediated by an interaction operator; and computing at least one sought property that characterizes the behavior of the at least one road user by applying, to the state of the node in the graph representation that corresponds to the at least one road user and/or to a work product derived from the state of the node in the graph representation that corresponds to the at least one road user, an evaluation operator, wherein the self-evolution operator and/or the interaction operator, and/or the evaluation operator includes training a neural network, and wherein the interaction operator includes a neural network with at least two fully connected layers that is applied to the edge attributes of an edge connecting two interacting nodes;

wherein computing the at least one sought property includes:

updating the self-evolution operator to yield a new state of a node; and predicting, based on the new state, at least one sought property by the evaluation operator of the neural network for each road user in a temporal sequence.

13. The non-transitory machine-readable data carrier of claim 12, wherein a relative magnitude of the evolution operator with respect to an aggregated interaction message conveyed by a subset of the nodes indicates an importance the self-evolution is compared with the interaction.

14. One or more computers and/or compute instances configured to predict a behavior of at least one road user in a traffic situation, the one or more computers and/or compute instances configured to:

obtain a graph representation of the traffic situation, the graph representation having nodes and edges, wherein:

the nodes of the graph represent road users, the edges of the graph represent interactions between the road users and define an adjacency between road users, each node of the nodes is associated with a state including a plurality of state variables, and each edge of the edges is associated with a plurality of edge attributes;

compute an evolution of the states of the nodes based at least in part on:

a self-evolution of the state of each considered node that is dependent on at least the state and mediated by a self-evolution operator; and an interaction of each considered node with other nodes that is dependent on the states of the other nodes and mediated by an interaction operator; and compute at least one sought property that characterizes the behavior of the at least one road user by applying, to the state of the node in the graph representation that corresponds to the at least one road user and/or to a work product derived from the state of the node in the graph representation that corresponds to the at least one road user, an evaluation operator, wherein the self-evolution operator and/or the interaction operator, and/or the evaluation operator includes training a neural network, and wherein the interaction operator includes a neural network with at least two fully connected layers that is applied to the edge attributes of an edge connecting two interacting nodes;

wherein computing the at least one sought property includes:

updating the self-evolution operator to yield a new state of a node; and predicting, based on the new state, at least one sought property by the evaluation operator of the neural network for each road user in a temporal sequence.

15. The one or more computers and/or compute instances of claim 14, wherein a relative magnitude of the evolution operator with respect to an aggregated interaction message conveyed by a subset of the nodes indicates an importance the self-evolution is compared with the interaction.

* * * * *